(12) United States Patent
Annan et al.

(10) Patent No.: US 8,272,030 B1
(45) Date of Patent: Sep. 18, 2012

(54) DYNAMIC SECURITY MANAGEMENT FOR MOBILE COMMUNICATIONS DEVICE

(75) Inventors: Brandon C. Annan, Westwood Hills, KS (US); Dhananjay Indurkar, Overland park, KS (US); John M. Jones, III, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 865 days.

(21) Appl. No.: 12/356,735

(22) Filed: Jan. 21, 2009

(51) Int. Cl.
*G06F 17/00* (2006.01)
*G06F 15/173* (2006.01)
*G06Q 30/00* (2012.01)
*G01N 21/86* (2006.01)
*G06F 15/16* (2006.01)

(52) U.S. Cl. .............. 726/1; 705/26.1; 709/223

(58) Field of Classification Search ........ 726/1; 705/26; 709/223
See application file for complete search history.

(56) References Cited

U.S. PATENT DOCUMENTS

2006/0224742 A1* 10/2006 Shahbazi ............... 709/226
2007/0266422 A1* 11/2007 Germano et al. ........... 726/1

FOREIGN PATENT DOCUMENTS
WO   WO 2006138408 A2 * 12/2006

OTHER PUBLICATIONS

Ong, I.; Hyotaek Lim; "Dynamic parameter configuration in virtual storage protocol for mobile appliances"; Computer Engineering and Technology (ICCET), 2010 2nd International Conference on vol. 6; Digital Object Identifier: 10.1109/ICCET.2010.5486279, Publication Year: Jul. 2010 , pp. V6-241-V6-244.*

* cited by examiner

*Primary Examiner* — Matthew Smithers
*Assistant Examiner* — Courtney Fields

(57) ABSTRACT

A method for dynamically changing the security protocol in a hand-held mobile communications device within a network includes providing an application management system in a respective mobile communications device for management of memory use and download functions, providing within the mobile communications device an embedded file system that contains executable files that are controlled by the application management system, providing a browser on the mobile communications device so that a user thereof may access websites available on the network, and providing a policy file that includes a set of rules for managing the download of applications from a remote location, the policy file being enabled to receive authorized updates over the network.

12 Claims, 3 Drawing Sheets

100
DYNAMIC SECURITY MANAGEMENT FOR MOBILE COMMUNICATIONS DEVICE

BACKGROUND

In prior systems, security management has typically been static. Implementing a policy file is usually achieved by inserting it under the device where the application management system is coded to read that policy file and then apply security measures to applications, such as Java applications, based upon how the policy file is structured and some of the system rules put in place by the device provider. This is implemented to control and manage access to restricted or protected APIs and to determine whether the user has to confirm access to an API, or whether there is digital signing required for access to the APIs, for example.

The typical policy file is a text file residing on the mobile device above the device operating system which reads, deciphers, and then applies the rules to any executing applications. Once the device is deployed in the market place, there is currently no efficient method to change or update any aspect of the policy file as initially deployed. For example, both Java ME MIDlets based on the MIDP specification are each implementations as compiled into device binary that have a static security policy that is not updateable once deployed in the market place.

SUMMARY

This Summary is provided to introduce select concepts hereof in a simplified form that are further described below in the Detailed Description. This Summary is not intended to identify all key elements, characteristic functionalities, or essential features of the claimed subject matter, nor is it intended in any way to limit the scope of the claimed subject matter.

Thus with the above in mind, one aspect of the present invention is directed to a dynamic security policy implemented as a device mechanism that allows the device provider to push a new policy file to the device and have it inserted such that the mechanism will take the existing policy file, back it up, and save it in a temporary location, until the new policy file replaces the existing one. Once the new policy file is inserted and rendered functional, the Application Management System (AMS) will apply all new policy file requirements to the application.

Another aspect of the present invention is to have the mobile device pull from the system a new policy file. In either the push or pull embodiments of a new policy file being provided according to the teachings hereof, the deployed device will thereby be in an improved state to accommodate location based services.

More specifically now according to certain embodiments of the present invention, there is provided one or more computer-readable media having computer-executable instructions for performing a method of dynamically changing the security protocol in a hand-held mobile communications device within a network. In one particular embodiment thereof, the method includes the steps of managing memory use and download functions in a respective mobile communications device with an application management system; controlling executable files in an embedded file system within the mobile communications device with the application management system, the embedded file system including an updatable policy file that includes a first set of rules for managing the download of applications from a first remote location; accessing websites available on the network with a browser implemented in the mobile communications; and updating the policy file from a second remote location with a revised set of rules so that an application prevented by the first set of rules from being download is rendered downloadable under the revised set of rules.

This method may include the further step of providing an application descriptor file and an archive file over the network. The application descriptor file may be advantageously implemented as a Java Application Descriptor file, and the archive file advantageously implemented as a Java ARchive file. Here the further step of downloading the application descriptor file onto the mobile communications device to thereby provide a place for appending a new policy file may be performed. Advantageously, an attribute thereof includes a Provider-Policy-Allow step or file such that the attribute of the new policy file allows a provider thereof to designate downloadable applications. Further, a permissions protocol that defines the permissions in the policy file to be overwritten may be provided. According to another aspect hereof, a provider trusted signature is required to enable overwrite of the policy file. The principal method of this embodiment may alternatively include the further step of providing a global policy file change wherein the step of providing a global policy file change may advantageously include the step of placing the application descriptor file and a provider policy text file on a web server. According to further aspects of this embodiment, the step of providing a global policy file change may also include the yet further step of launching the device browser to the application descriptor file that contains a provider signature and points to provider policy text file for a second file download. In this case, the method may still yet further include the step of enabling the application management system to check for the provider signature to allow replacement of the policy file and downloading of a new policy file.

In accordance with one aspect of this invention, there is also provided a hand-held mobile communications device for use within a network. One particular embodiment thereof includes an application management system for managing memory use and download functions; an embedded file system that contains executable files that are controlled by the application management system; a browser so that a user may access websites available on the network; and a policy file that includes a set of rules for managing the download of applications from a remote location, the policy file enabled to receive authorized updates over the network. The device may further include an application descriptor file such as a Java Application Descriptor file, and an archive file such as a Java ARchive file. In this case, the application descriptor file provides a place for appending a new policy file and may include a provider-policy-allow attribute which allows a provider thereof to designate downloadable applications. Here also, the device may advantageously include a permissions protocol that defines permissions in the policy file to be overwritten. And further, the device may also include a provider trusted signature requirement to enable overwrite of the policy file.

According to another aspect of certain embodiments of the present invention there is further provided an improved communications network system. A principal embodiment thereof may include (1) a hand-held mobile communications device for use within the network, the device including an application management system for managing memory use and download functions; an embedded file system that contains executable files controlled by the application management system; a browser so that a user may access websites available on the network; and a policy file that includes a set of rules for managing the download of applications from a remote location, the policy file enabled to receive authorized updates over the network, (2) a host server system accessible by the device over the network, the host server system including a selection of on-portal applications that the user may download onto the device, the host server system being maintained by an authorized service provider, and (3) a website provider server accessible by the device over the network, the website provider server including a selection of off-portal applications that the user may download onto the device after the service provider has updated the policy file in the device so that the off-portal applications are thereby rendered downloadable onto the device. Here similarly, the device may advantageously include an application descriptor file and a archive file wherein the application descriptor file provides a place for appending a new, policy file. Similarly here as well, the application descriptor file may be implemented as a Java Application Descriptor file and the archive file deployed as a Java ARchive file. In addition thereto, when the user attempts to download an off-portal application that has not been certified by the service provider, the device will display an error message to thereby prevent uncertified applications from being downloaded onto the mobile device.

BRIEF DESCRIPTION OF THE DRAWING FIGURES

Further aspects and characteristics of the embodiments of the present invention together with additional features contributing thereto and advantages accruing therefrom will be apparent from the following description of certain embodiments of the invention which are shown in the accompanying drawing, wherein.

DETAILED DESCRIPTION

The subject matter of the embodiments of the present invention is described with specificity herein to meet statutory requirements. However, the description itself is not intended to limit the scope of the claims of any patents issuing hereon. Rather, the inventors have contemplated that the claimed subject matter might also be embodied in other ways, include different steps or combinations of steps similar to the ones described herein, or used in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Figure 1:
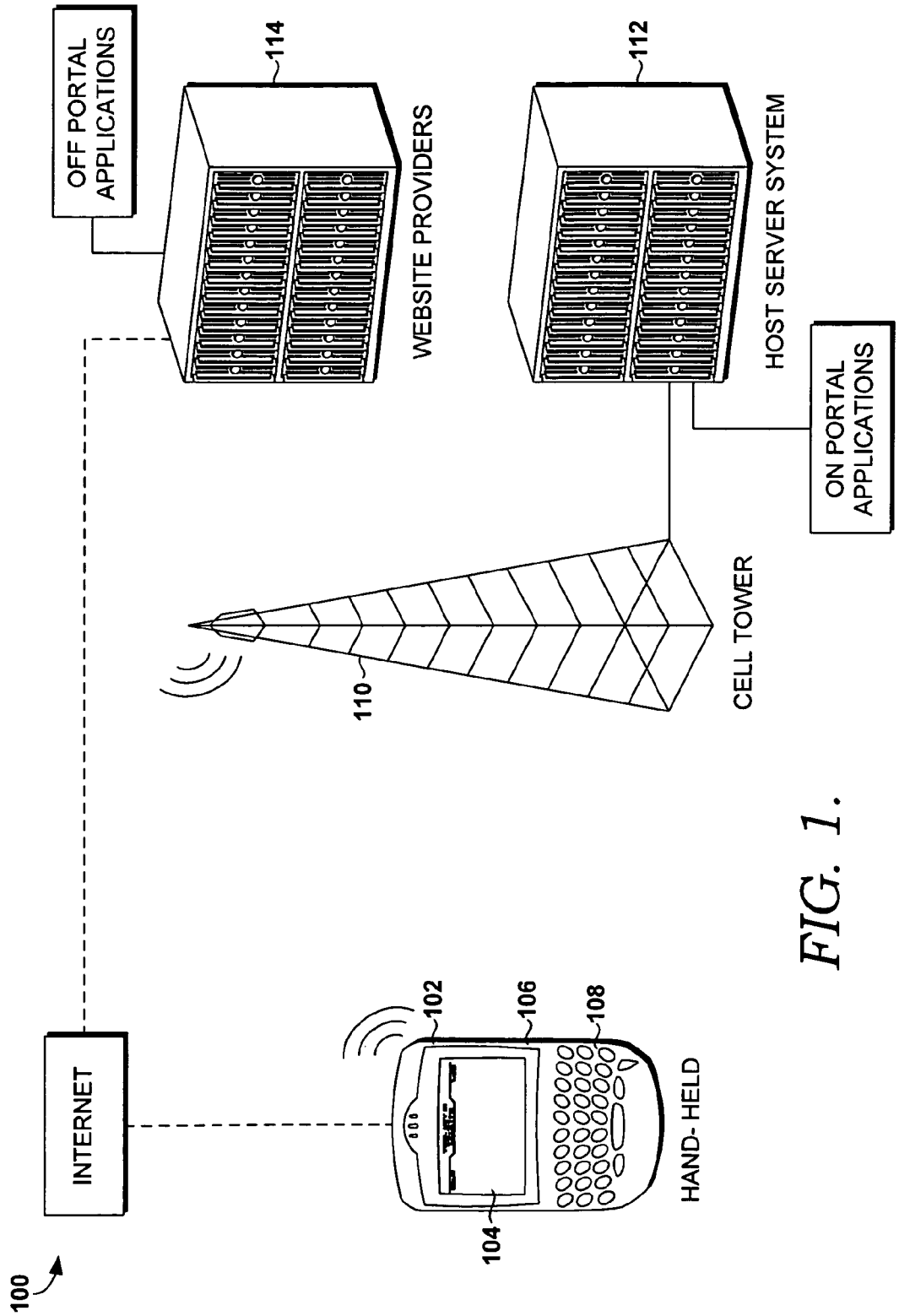
FIG. 1 is a partial perspective pictorial and block diagram representation of a telecommunications network in which various embodiments of the present invention are implemented.

Having briefly described above an overview of the present invention, an illustrative operating environment for this invention is next described. Referring now to FIG. 1, an exemplary operating environment for implementing embodiments of the present invention is shown and designated generally as a telecommunications network 100. The telecommunications network 100 is widely implemented to facilitate the use of a mobile device 102. The mobile device 102 may be of the type employed as a cell phone, personal digital assistant, or any other hand-held mobile computing device that provides at least a telecommunications function as well as Internet access. The mobile device 102 typically includes a monitor or screen 104, functional operation buttons 106, and text and number input keys 108. The mobile device 102 illustrated in FIG. 1 is of the multi-function type well known to the typical user in today's mobile environment, which is enabled to send and receive telephone calls, text messages, and e-mails and which further provides Internet access and the ability to download software applications retrieved from any one of various servers connected to or accessible over the Internet. Thus the device 102 includes its own browser 115 (FIG. 2) for accessing websites over the Internet.

In the case of providing cell phone functionality, the network 100 further includes a cell tower 110 to receive signals from the device 102. Only one such cell tower 110 is illustrated for purposes of discussion. It should be readily understood, however, by those of skill in the art that several such cell towers 110 would be positioned at various locations when providing a national cell network, for example. The cell tower 110 in turn is connected to a host service system base station 112 maintained by the device provider or host service company. In a typical use scenario as a hand-held computing device, the host service or device provider makes available to the user of the device 102 a suite of applications referred to as on-portal applications. While some application may be on the device when deployed various others are made available to the user over the hosted system via a network connection. Such a network connection is typically provided on a subscription basis while provision of the on-portal applications post-deployment are typically provided on a fee-for-purchase basis. As further illustrated in FIG. 1, a website provider unaffiliated with the service provider may offer the user of the device 102 a wide variety of off-portal applications from the website provider's server 114 which is accessed by the browser provided in the hand-held device 104.

Figure 2:
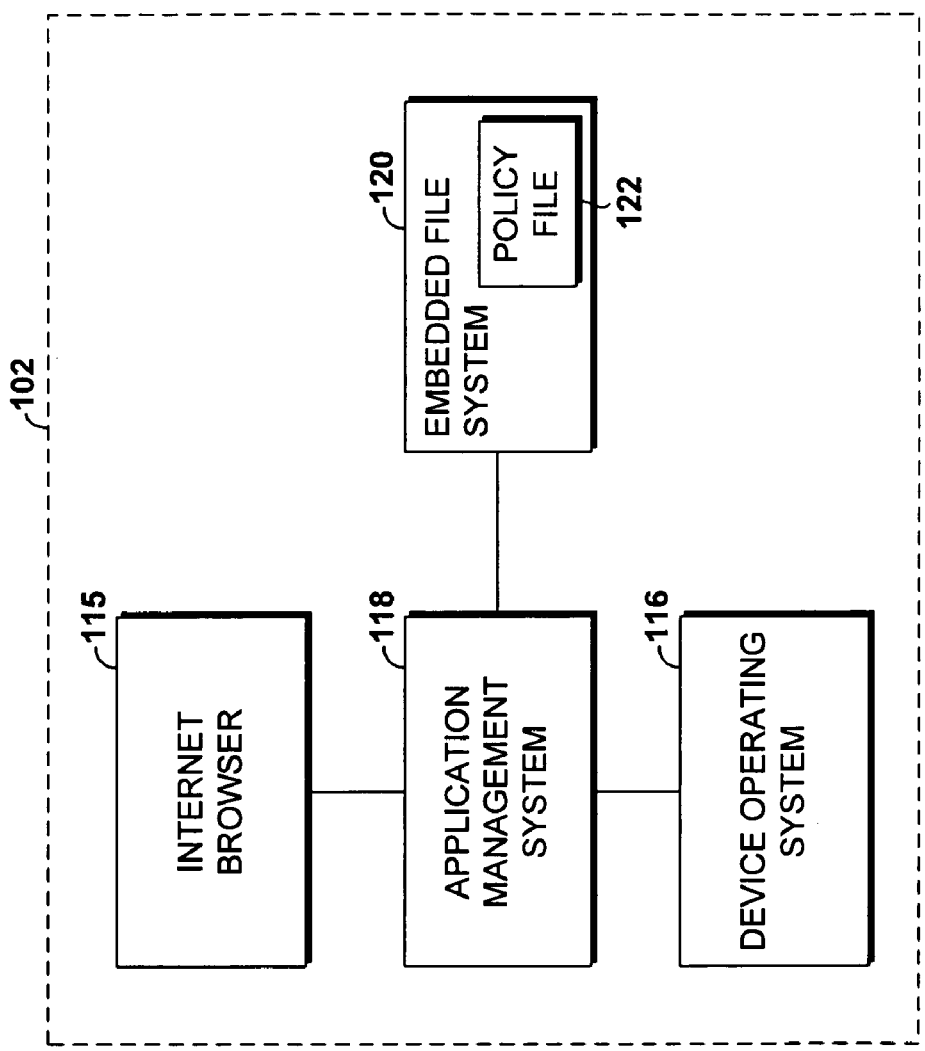
FIG. 2 is a simplified block diagram representation of a mobile device according to the present invention showing a policy file within an embedded file system.

With reference now to FIG. 2, there is shown a schematic representation of the mobile device 102 including an operating system 116 which engages an application management file or system 118 which further engages an embedded file system 120 including a policy file 122. The operating system 116 initializes the when the mobile device 102 is activated or launched. The application management system 118 controls a number of different features on the handset 102 such as how much memory is allocated to certain applications. It also manages how much memory is available overall and it handles downloads from the entire download mechanism including the Internet download mechanism.

The application management system 118 is considered an external application that has functionality into execution environments like Java, and into other applications that handle content, such as a PDF file, screen saver, or a ring tone. The policy file 122 resides on the phone or mobile device 102 and is stored in the embedded file system 120 of the device as discussed above. The application management system 118 includes code written to read what the policy file 122 contains in terms of security rules. The application management system 118 then builds a decision tree to determine whether an application defines, in this case, a specific Java package. In the case where the desired Java package is present, the application management system 118 allows use of the corresponding application programming interface (API). The application management system 118 reads the policy file 122 and when a Java application is downloaded to the device over the air, the system 118 looks at what has been downloaded, reads the policy file, and makes a determination about whether the application being downloaded is configured properly to access the application programming interface. Thus in this manner, the service provider may employ the application management file system 118 and the policy file 122 to ensure that any downloaded application is compatible with the device 102.

As long as the AMS in advance is so programmed, then whatever is requested is allowed as long as a signature is not a requirement. If there is a particular requested API that is protected and a requirement that it needs to be signed, and the device does not have it signed, then a certain error condition will be presented to the user that indicates that this respective application is not authorized to access this API. In this situation the user at this point would have to cancel out and not proceed with the download. For certification applications provided by the service provider or otherwise so certified, such an error condition will not occur and the download will proceed without user interruption.

The service provider thus may provide certification of off-portal applications to determine whether they meet its standards for being available for sale on one of its handsets. Ideally, the user of a device provided by a service provider should always have a positive experience when downloading applications. In the current environment, however, there are situations where a user of the device 102 may buy content that was not purchased from the provider's vending machine as illustrated in FIG. 1 by the host server system 112 or otherwise certified by the provider in the case of an off-portal application provided by a website provider's server 114. In these situations of un-certified off-portal content or applications, the user is made aware that the device is trying to do something that is not allowed to do as so controlled by the policy file 122.

Thus the present invention is directed to dynamically providing an updated policy file. In the case of a reactive model to market conditions, one example application includes the case where a first provider restricts access to GPS location data and requires special signature for security to allow access. If a second provider were to open up location on its device, one embodiment of the present method would allow the first provider's developers to get location access on devices that are traditionally locked. In the case of trusted business partners that need to enable restricted API, they may be advantageously allowed to overwrite the security policy to open up a platform for their authorized use. This would then avoid the need to obtain new software binary from OEMs. And further yet, in the case where the provider is hacked or too open, this method allows customers to get secured applications.

Figure 3:
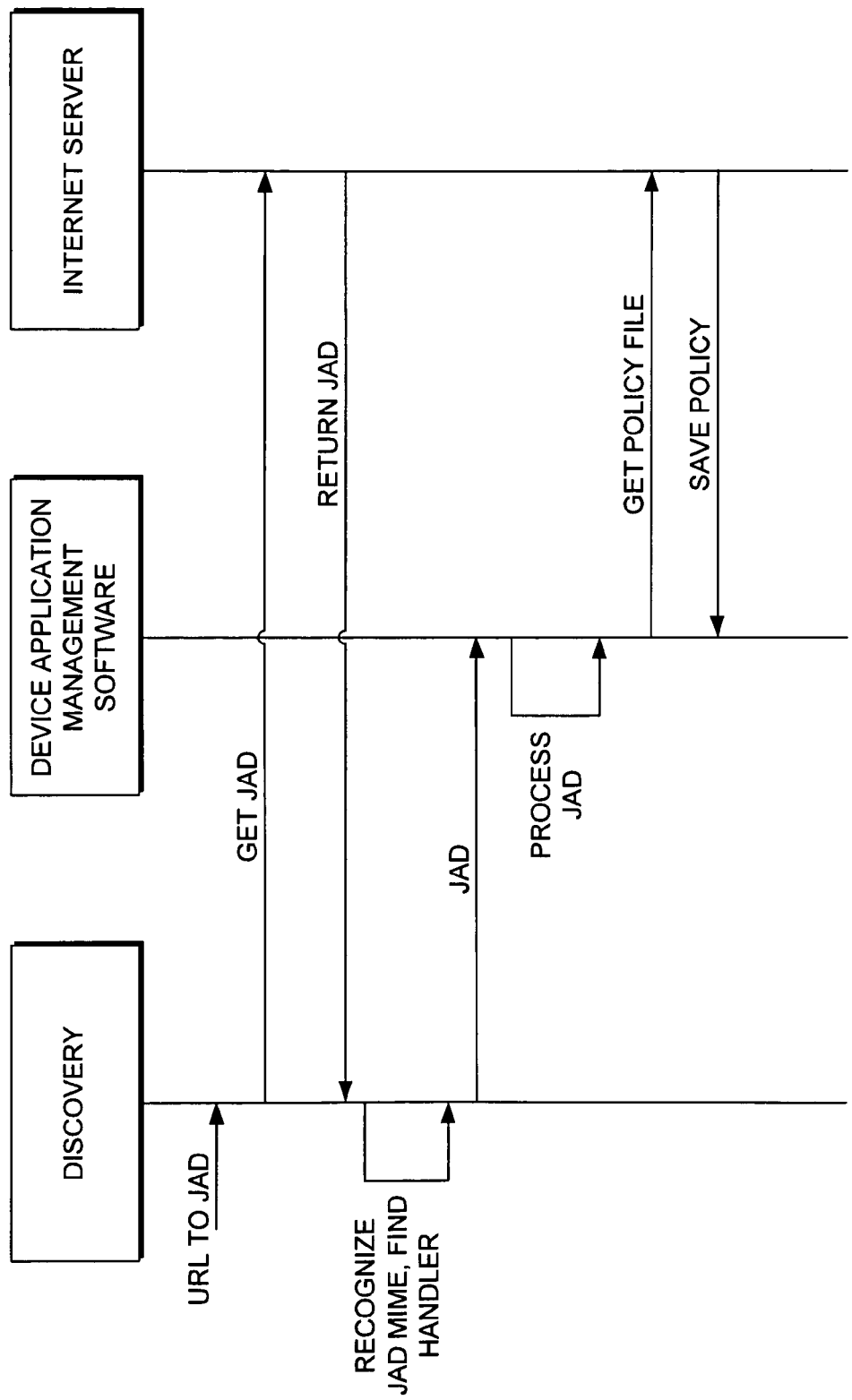
FIG. 3 is a method flow diagram showing a download and install procedure of a new policy file according to a particular embodiment of a method of this invention.

To provide further detailed disclosure relating hereto, the following illustrative specific implementations are provided in the table below with reference to FIG. 3.

TABLE 1

Use of a Specific Policy File for Single Application

Use a specific policy file for single Application:

Java ME MIDlets (applications) have 2 files required to place on device. JAD - Java Application Descriptor and JAR - Java ARchive
The JAD file is downloaded first and is where the new policy is appended to.
Attribute: "Sprint-Policy-Allow:"
Permissions: defines the permissions in existing policy file to be overwritten TABLE 1-continued Use of a Specific Policy File for Single Application Requires Sprint trusted signature to enable overwrite
How on global policy file change:

place a JAD file and "sprint_policy.txt" file on webserver
Launch device browser to JAD file that contains sprint signature and points to sprint_policy.txt for second file download
AMS checks signature to allow replacement and downloads the new policy file Here then, as would be understood by those skilled in the art given the present disclosure, the inventors have provided methods, process, apparatus, and systems directed to a policy file maintained within the embedded file system in a mobile device that engages an application management system and operating system of the device so that once the device is deployed into service, the service provider or an authorized agent may dynamically update the policy file to achieve the advantages, characteristics, and improved functionality discussed above.

Thus while this invention has been described in detail with reference to certain embodiments, it should be appreciated that the present invention is not limited to those precise embodiments. Rather, in view of the present disclosure which describes the current best mode for practicing the invention, many modifications and variations would present themselves to those of skill in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

What is claimed is:

1. One or more nontransitory computer-readable media having computer-executable instructions for performing a method of dynamically changing the security protocol in a hand-held mobile communications device within a network, said method comprising the steps of:

managing memory use and download functions in a respective mobile communications device with an application management system;

controlling executable files in an embedded file system within said mobile communications device with said application management system, said embedded file system including an updatable policy file that includes a first set of rules for managing the download of applications from a first remote location, wherein the rules are applied, by said application management system, to applications executing on the mobile communications device;

accessing websites available on the network with a browser implemented in said mobile communications;

updating said policy file from a second remote location with a revised set of rules so that an application prevented by said first set of rules from being downloaded is rendered downloadable under said revised set of rules; and providing a global policy file change, wherein providing a global policy file change includes placing an application descriptor file and a provider policy file on a webserver to provide for downloading of a new policy file.

2. The media according to claim 1 wherein an attribute of said new policy file allows a provider thereof to designate downloadable applications.

3. The media according to claim 2 wherein said updatable policy file includes permissions that are overwritten to allow the downloading of newly designated downloadable applications.

4. The media according to claim 3 wherein a provider trusted signature is required to enable overwrite of said updatable policy file.

5. The media according to claim 1 wherein providing a global policy file change includes launching said device browser to said application descriptor file that contains a provider signature and points to said provider policy text file for a second file download.

6. The media according to claim 5 wherein providing a global policy file change includes enabling said application management system to check for said provider signature to allow replacement of said policy file and downloading of said new policy file.

7. A hand-held mobile communications device for use within a network, said device comprising:
   an application management system for managing memory use and download functions;
   an embedded file system that contains executable files that are controlled by said application management system;
   a browser so that a user may access websites available on the network;
   a policy file that includes a set of rules for managing the download of applications from a remote location, said policy file enabled to receive authorized updates over the network, wherein the rules are applied, by said application management system, to applications executing on the mobile communications device; and
   an application descriptor file and an archive file, wherein said application descriptor file provides a place for appending a new policy file.

8. The device according to claim 7 wherein said application descriptor file includes an attribute that allows a provider thereof to designate downloadable applications.

9. The device according to claim 8 wherein said policy file includes permissions that are overwritten to allow the downloading of newly designated downloadable applications.

10. The device according to claim 9 wherein a provider trusted signature is required to enable overwrite of said policy file.

11. An improved communications network system, comprising:
    a hand-held mobile communications device for use within the network, said device including an application management system for managing memory use and download functions, an embedded file system that contains executable files that are controlled by said application management system, a browser so that a user may access websites available on the network, a policy file that includes a set of rules for managing the download of applications from a remote location, said policy file enabled to receive authorized updates over the network, and an application descriptor file and an archive file, wherein said application descriptor file provides a place for appending a new policy file;
    a host server system accessible by said device over the network, said host server system including a selection of on-portal applications that said user may download onto said device, said host server system being maintained by an authorized service provider; and
    a website provider server accessible by said device over the network, said website provider server including a selection of off-portal applications that said user may download onto said device after said service provider has updated said policy file in said device so that said off-portal applications are thereby rendered downloadable onto said device.

12. The system according to claim 11 wherein when said user attempts to download an off-portal application that has not been certified by said service provider, said device will display an error message.

* * * * *